(12) United States Patent
Chen et al.

(10) Patent No.: US 8,743,939 B2
(45) Date of Patent: Jun. 3, 2014

(54) NONLINEAR ECHO COMPENSATOR FOR CLASS B TRANSMITTER LINE DRIVER

(75) Inventors: Xiaopeng Chen, Sunnyvale, CA (US); Runsheng He, Sunnyvale, CA (US); Shuran Wei, San Jose, CA (US)

(73) Assignee: Marvell International Ltd., Hamilton (BM)

(*) Notice: Subject to any disclaimer, the term of this patent is extended or adjusted under 35 U.S.C. 154(b) by 1107 days.

(21) Appl. No.: 12/215,222

(22) Filed: Jun. 26, 2008

(65) Prior Publication Data
US 2008/0267327 A1    Oct. 30, 2008

Related U.S. Application Data

(63) Continuation of application No. 10/189,321, filed on Jul. 30, 2002, now Pat. No. 7,409,057.

(51) Int. Cl.
*H03H 7/30* (2006.01)
*H03H 7/40* (2006.01)
*H03K 5/159* (2006.01)

(52) U.S. Cl.
USPC ...... 375/229; 375/316; 375/324; 379/406.06; 379/406.08

(58) Field of Classification Search
USPC .......................................... 375/229, 316, 324
See application file for complete search history.

(56) References Cited

U.S. PATENT DOCUMENTS

| | | | |
|---|---|---|---|
| 3,647,992 A * | 3/1972 | Thomas | 379/406.08 |
| 4,977,591 A * | 12/1990 | Chen et al. | 379/406.1 |
| 6,240,128 B1 * | 5/2001 | Banerjea et al. | 375/222 |
| 6,574,336 B1 * | 6/2003 | Kirla | 379/406.01 |
| 6,628,780 B2 * | 9/2003 | Duttweiler et al. | 379/406.08 |
| 6,934,387 B1 | 8/2005 | Kim | |
| 7,450,714 B2 * | 11/2008 | Farrell et al. | 379/406.05 |
| 2003/0026365 A1 * | 2/2003 | Ho et al. | 375/347 |

FOREIGN PATENT DOCUMENTS

EP    895397 A2 *    2/1999

OTHER PUBLICATIONS

U.S. Appl. No. 09/920,240, filed Aug. 2001, Roo et al.
IEEE std. 802.3ab-1999, Sponsor LAN MAN Standards Committee of IEEE Computer Society, "Supplement to Carrier Sense Multiple Access with Collision Detection (CSMA/CD) Access Method and Physical Layer Specifications—Physical Layer Parameters and Specifications for 1000Mb/s Operation Over 4-Pair of Category 5 Balanced Copper Cabling, Type 1000BaseT".

* cited by examiner

*Primary Examiner* — Chieh M Fan
*Assistant Examiner* — Freshteh N Aghdam (57) ABSTRACT

A nonlinear echo compensator comprises a mapping circuit that includes a weighting circuit that generates a weighted signal based on a current symbol and a prior symbol and a function generating circuit that selects one of N functions based on the weighted signal, where N is an integer greater than one. The mapping circuit generates a driving signal based on the selected one of the N functions and the weighted signal. A canceling circuit generates a nonlinear echo compensation signal based on the driving signal.

24 Claims, 11 Drawing Sheets

CLASS A

| PC | NC | Level |
|---|---|---|
| 8 | 0 | 8 |
| 7 | 1 | 6 |
| 6 | 2 | 4 |
| 5 | 3 | 2 |
| 4 | 4 | 0 |
| 3 | 5 | -2 |
| 2 | 6 | -4 |
| 1 | 7 | -6 |
| 0 | 8 | -8 |

FIG. 7
Prior art

CLASS B

| PC | NC | Level |
|---|---|---|
| 8 | 0 | 8 |
| 6 | 0 | 6 |
| 4 | 0 | 4 |
| 2 | 0 | 2 |
| 0 | 0 | 0 |
| 0 | 2 | -2 |
| 0 | 4 | -4 |
| 0 | 6 | -6 |
| 0 | 8 | -8 |

NONLINEAR ECHO COMPENSATOR FOR CLASS B TRANSMITTER LINE DRIVER

CROSS-REFERENCE TO RELATED APPLICATIONS

This application is a continuation of U.S. Ser. No. 10/189,321, filed Jul. 3, 2002. The disclosure of the above application is incorporated herein by reference in its entirety.

FIELD OF THE INVENTION

The present invention relates to transmitting and receiving electrical signals through a communications channel, and more particularly to a nonlinear echo compensator for a Class B transmitter line driver.

BACKGROUND OF THE INVENTION

IEEE section 802.3ab, which is hereby incorporated by reference, specifies physical layer parameters for 1000BaseT (gigabit) communications channels. The gigabit communications channel employs four twisted pairs of cable. Signals transmitted over the cable are degraded by signal attenuation, return loss, echo, and crosstalk.

Figure 1:
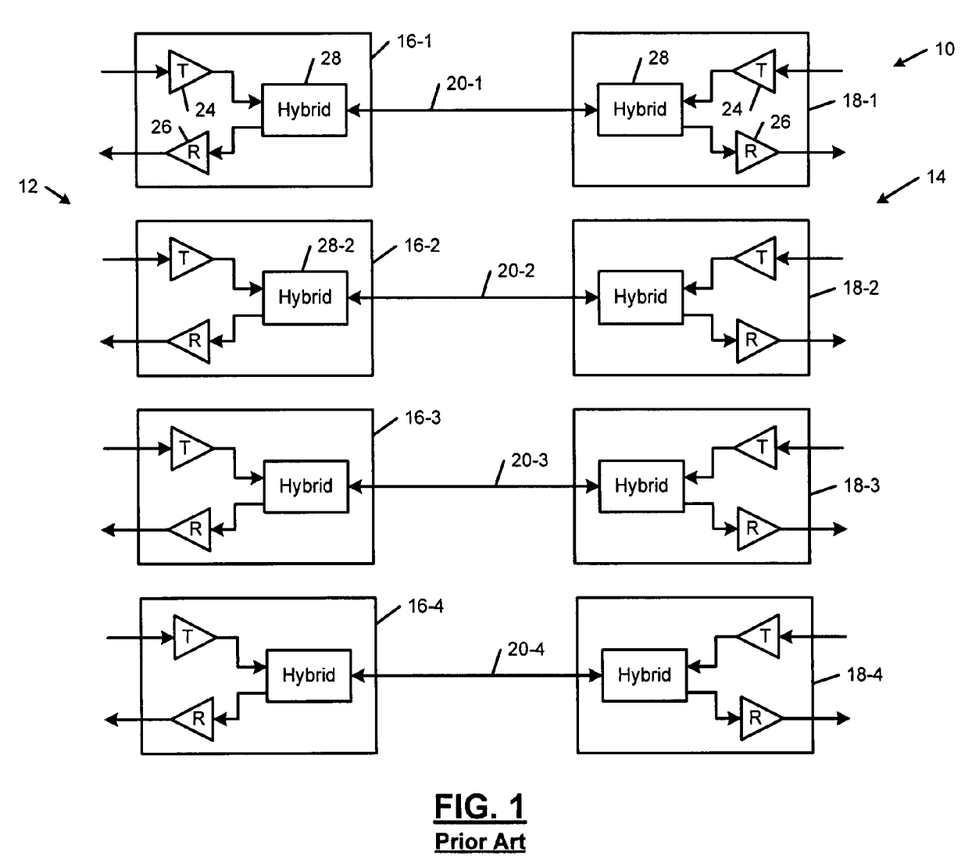
FIG. 1 is a functional block diagram illustrating an exemplary gigabit communications channel according to the prior art.

Referring now to FIG. 1, a gigabit Ethernet communications channel 10 is shown. The communications channel 10 includes two nodes 12 and 14 that transmit and receive one gigabit per second (Gbps). The node 12 includes transceivers 16-1, 16-2, 16-3, and 16-4 and the node 14 includes transceivers 18-1, 18-2, 18-3 and 18-4. Each transceiver transmits at 250 Mbps. The transceivers 16 and 18 are connected to opposite ends of twisted pairs 20-1, 20-2, 20-3, and 20-4. For example, the transceiver 16-1 is connected to one end of the twisted pair 20-1. The transceiver 18-1 is connected to the opposite end of the twisted pair 20-1. Each transceiver 16 and 18 includes a transmitter 24, a receiver 26, and a hybrid circuit 28.

The transmitter 24 of the transceiver 16-1 generates a five level pulse amplitude modulated (PAM-5) signal that is transmitted by the transmitter 24 and the hybrid circuit 28 of the transceiver 16-1 onto the twisted pair 20. The hybrid circuit 28 and the receiver 26 of the transceiver 18-1 receive the PAM-5 signal. The hybrid circuit 28 enables bi-directional transmission over the same twisted pairs by filtering out the transmit signal at the receiver 26.

Attenuation refers to signal loss of the twisted pair between the transmitter of one receiver and the receiver of another transceiver and is caused by several factors including skin effect. To minimize the effect of attenuation, the lowest possible frequency range that supports the required data rate is typically used. Return loss quantifies the amount of power that is reflected due to cable impedance mismatches.

Echo occurs when signals are transmitted and received on the same twisted pair. Echo is caused by residual transmit signals and cable return loss. Crosstalk occurs due to signal coupling between twisted pairs that are in close proximity. For example, the twisted pairs used in 1000BaseT are affected by crosstalk from adjacent twisted pairs. Near end crosstalk (NEXT) is crosstalk at the transmitter end of the twisted pair. Far- and crosstalk (FEXT) is crosstalk at the receiver end of the twisted pair. Crosstalk is preferably minimized to improve receiver symbol recovery.

Figure 2:
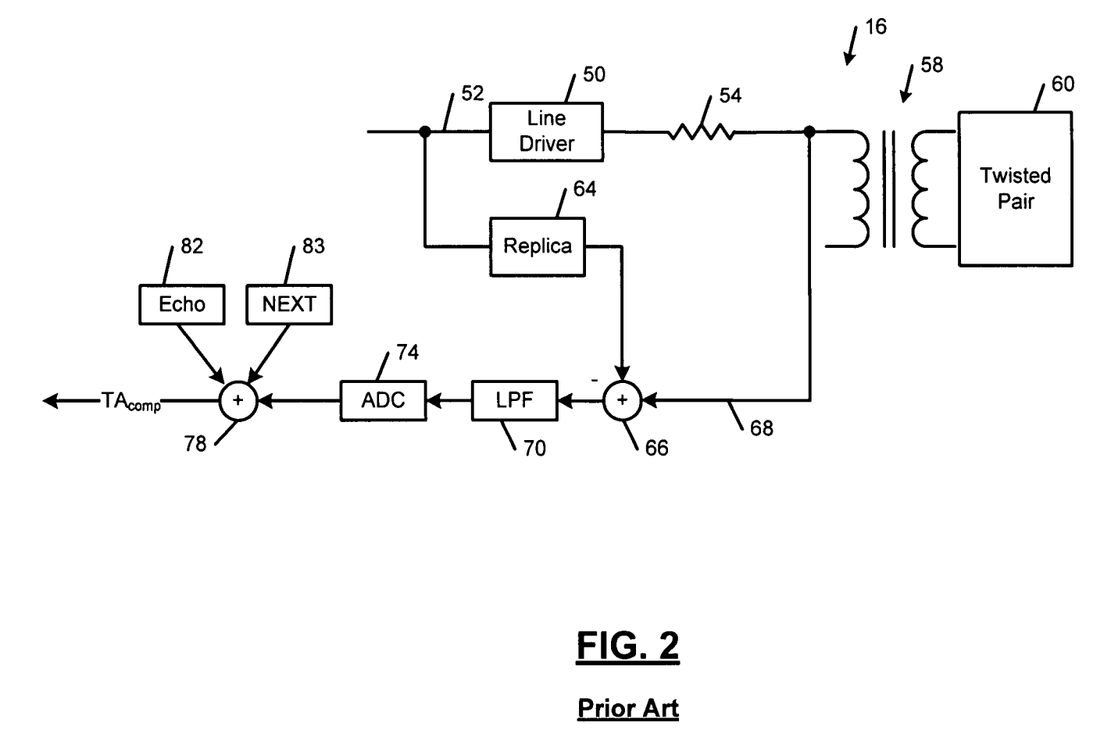
FIG. 2 is a functional block diagram illustrating a transceiver with a transmitter line driver and linear echo, NEXT and replica transmitter signal compensation according to the prior art.

Referring now to FIG. 2, the transceiver 16 includes a transmitter line driver 50 that receives a transmitter signal 52. The transmitter line driver 50 outputs a multi-level signal to a load such as a matched resistor 54. A transformer 58 couples the transceiver 16 to a twisted pair 60. A replica signal generator 64 outputs a replica of the transmitter signal 52 to a summer 66. A received signal 68 is also input to the summer 66.

Since the communications channel transmits and receives on the same twisted pair 60, the replica transmitted signal is cancelled or subtracted from the received signal 68. In addition, compensation for NEXT and echo is performed. An output of the summer 66 is input to an optional low pass filter (LPF) 70. An output of the LPF 70 is input to an analog to digital converter (ADC) 74. An output of the ADC 74 is input to a summer 78. A linear echo compensation circuit 82 and NEXT compensation circuit 83 (for $NEXT_{12}$, $NEXT_{13}$, and $NEXT_{14}$) are also input to the summer 78. A signal ($TA_{comp}$) with NEXT and linear echo compensation is output by the summer 78. Additional details concerning the transceiver 16 can be found in "Active Resistive Summer for a Transformer Hybrid", U.S. patent application Ser. No. 09/920,240, filed Aug. 1, 2001, and "A Method and Apparatus for Digital Near-End Echo/Near-End Crosstalk Cancellation with Adaptive Correlation", U.S. patent application Ser. No. 09/465,228, filed Dec. 17, 1999, which are hereby incorporated by reference.

Figure 3:
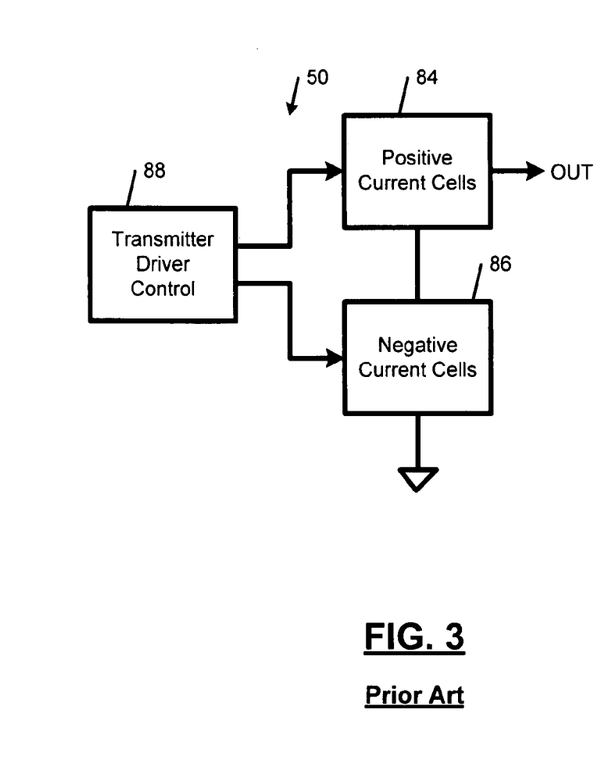
FIG. 3 is a functional block diagram of the transmitter line driver of FIG. 2 according to the prior art.

Referring now to FIG. 3, the transmitter line driver 50 is shown further and typically includes a plurality of positive current cells 84 and negative current cells 86. A transmitter driver control 88 selectively switches the positive and negative current cells 84 and 86 on and off to produce positive and negative signal levels. For example, the transmitter line driver for 1000BaseT employs five symbol levels –2, –1, 0, +1, and +2, which are usually implemented as 0V, +/–0.5V and +/–1V. Future communications systems may include additional symbol levels for increased bandwidth. For example, future signal levels may include 0, +/–2, +/–4, +/–6, and +/–8 signal levels.

Figure 4:
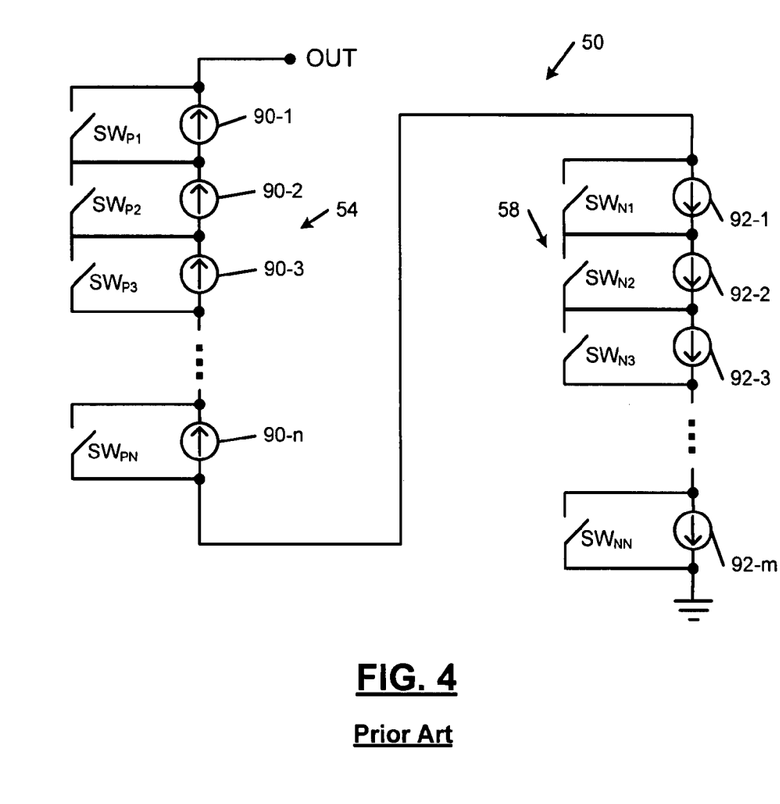
FIG. 4 is a conceptual electrical schematic of the transmitter line driver according to the prior art.
Figure 5:
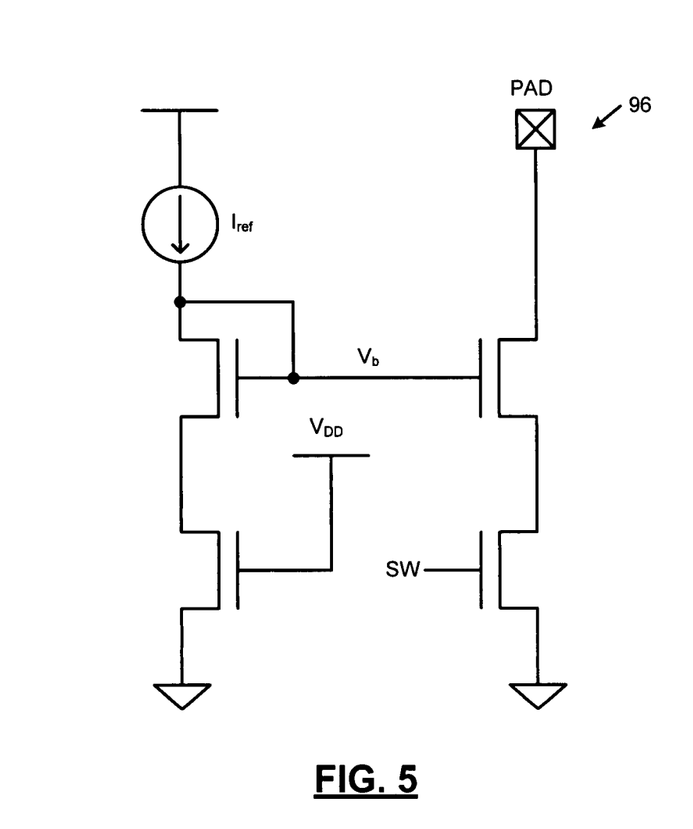
FIG. 5 is an electrical schematic of an exemplary positive current cell in the transmitter line driver according to the prior art.
Figure 6:
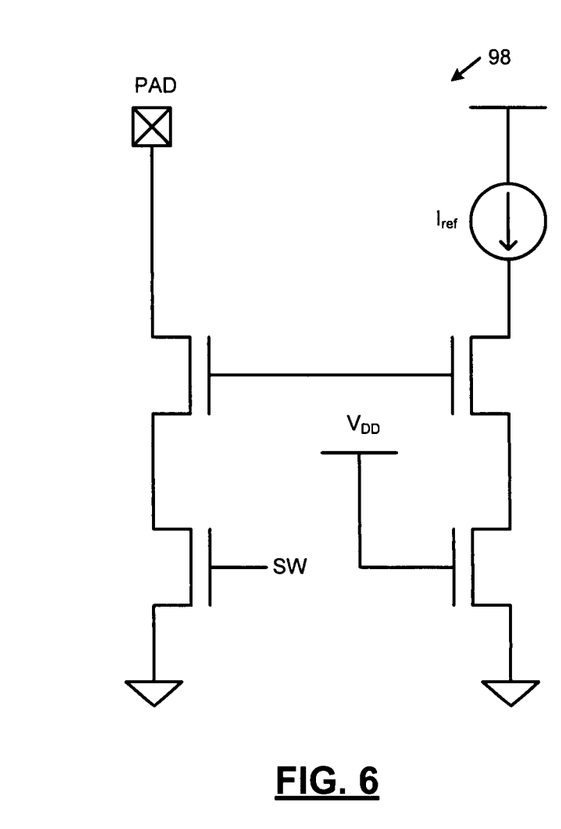
FIG. 6 is an electrical schematic of an exemplary negative current cell in the transmitter line driver according to the prior art.

Referring now to FIG. 4, a conceptual illustration of the transmitter line driver 50 is shown. The positive current cells 84 can be thought of as a plurality of individual current sources 90-1, 90-2, 90-3, . . . , and 90-$n$ that are switched by switches $SW_{P1}$, $SW_{P2}$, $SW_{P3}$, . . . , and $SW_{Pn}$. The negative current cells 86 can be thought of a plurality of individual current sources 92-1, 92-2, 92-3, . . . , and 92-$m$ that are switched by switches $SW_{N1}$, $SW_{N2}$, $SW_{N3}$, . . . , and $SW_{Nm}$. Typically, m=n. Referring now to FIG. 5, an exemplary positive current cell 96 is shown. In FIG. 6, an exemplary negative current cell 98 is shown. As can be appreciated, other positive and negative current cells can be utilized.

When the transmitter line driver 50 is operated in a Class A operating mode, the number of positive current cells that are turned on/off for a transition from a first signal level to a second signal level is equal to the number of negative current cells that are turned off/on. When the transmitter line driver 50 is operated in a Class B operating mode, the number of positive current cells that are turned on/off for a transition from a first signal level to a second signal level is not equal to the number of negative current cells that are turned off/on. The advantage of Class B operation is reduced power consumption as compared with Class A operation.

Figure 7:
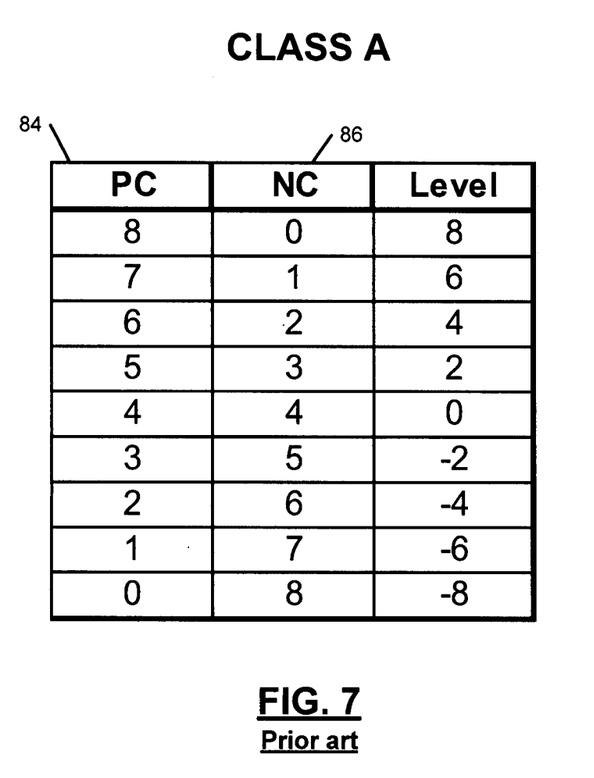
FIG. 7 is a table illustrating Class A operation of the transmitter line driver according to the prior art.

Referring now to FIG. 7, Class A operation of the positive and negative current cells 84 and 86 for nine symbol levels is shown. As can be appreciated, when switching between signal level 6 and signal level –4, there are an equal number of positive and negative current cells being turned on and off. In particular, five positive current cells are being turned off and five negative current cells are being turned on.

Figure 8:
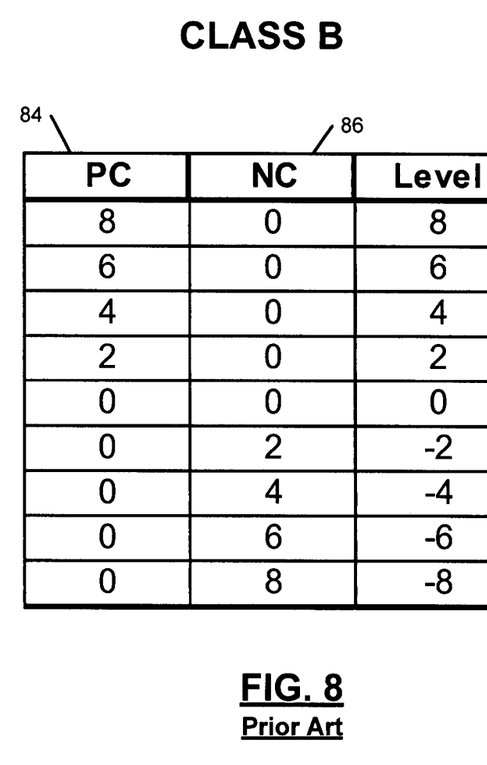
FIG. 8 is a table illustrating Class B operation of the transmitter line driver according to the prior art.

Referring now to FIG. 8, exemplary Class B operation of the positive and negative current cells 84 and 86 is shown. As can be appreciated, when switching between signal level 6 and signal level −4, an unequal number of positive and negative current cells are turned on and off. In particular, six positive current cells are turned off and four negative current cells are turned on. While Class B operation provides reduced power consumption, the asymmetry of Class B operation causes nonlinear echo that degrades performance.

SUMMARY OF THE INVENTION

A nonlinear echo compensator according to the present invention compensates for nonlinear echo in a transceiver including a transmitter line driver with current cells that are operated in an asymmetric low power mode. A mapping circuit generates a pattern dependent driving signal. A canceling circuit communicates with the mapping circuit and compensates for nonlinear echo in a received signal based on the pattern dependent driving signal.

In other features, the mapping circuit receives a multi-level signal and maps the multi-level signal to the pattern dependent driving signal. The mapping circuit includes a symbol weighting circuit that generates a weighted signal. The symbol weighting circuit generates the weighted signal by summing a first product of a current symbol and a first weighting factor with a second product of a prior symbol and a second weighting factor. The mapping circuit includes a function generator that generates the pattern dependent driving signal based on the weighted signal and a scaling circuit that scales the pattern dependent driving signal.

In still other features, a coefficient generator generates a first compensator coefficient based on a sum of a prior compensator coefficient and a product of an error signal and a sign function of the pattern dependent driving signal. The coefficient generator generates first, second and third compensator coefficients.

In other features, the canceling circuit includes a first multiplier that has a first input that receives the pattern driving signal and a second input that receives the first compensator coefficient. The first multiplier generates a first product. A second multiplier has a first input that receives the pattern driving signal and a second input that receives the second compensator coefficient. The second multiplier generates a second product. A third multiplier has a first input that receives the pattern driving signal and a second input that receives the third compensator coefficient. The third multiplier generates a third product.

In still other features, the canceling circuit further includes a first unit delay that receives the third product of the third multiplier. A first summer has a first input that receives the second product of the second multiplier and a second input that communicates with the first unit delay. A second unit delay communicates with an output of the first summer. A second summer has a first input that communicates with the second unit delay and a second input that receives the first product of the first multiplier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numerals will be used in the drawings to identify similar elements.

Figure 9:
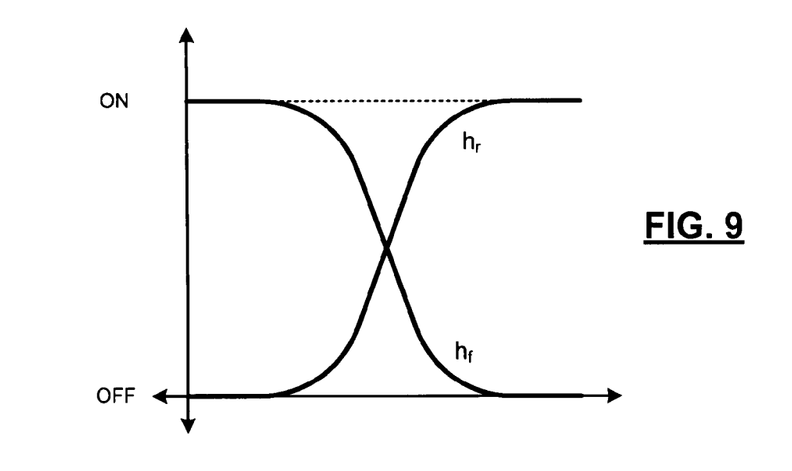
FIG. 9 illustrates ideal current cell rise and fall transition characteristics.
Figure 10:
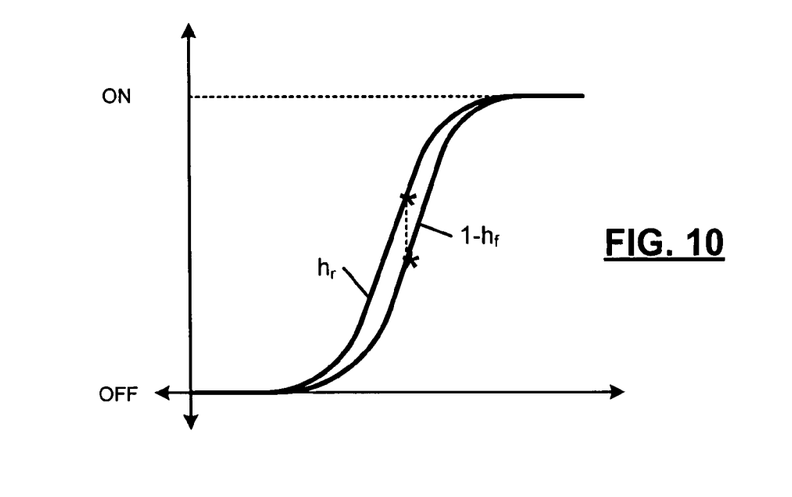
FIG. 10 illustrates actual current cell rise and fall transition characteristics.

Referring now to FIG. 9, rise $h_r$ and fall $h_f$ characteristics of an ideal current cell is shown. As can be appreciated, the ideal rise $h_r$ and fall $h_f$ characteristics are symmetric such that $h_r + h_f = 1$. In FIG. 10, rise $h_r$ and fall $h_f$ characteristics of typical current cells are not ideal. For some time periods, $h_r + h_f \neq 1$. The nonlinear echo compensation circuit for the Class B driver according to the present invention compensates for nonlinear echo that is introduced as a result of this asymmetry. The transmitter line driver of the transceiver according to the present invention can be operated in the Class B mode with reduced power consumption and without sacrificing performance.

The sampling point of the ADC 74 is determined by the received signal and not by the transmitted signal. In some cases, the sampling point occurs when the difference between $h_r$ and $1-h_f$ is greater than zero. The replica transmitter signal does not have nonlinear echo characteristics because the replica transmitter signal is not generated by the transmitter line driver, which is the source of the nonlinear echo.

Figure 11:
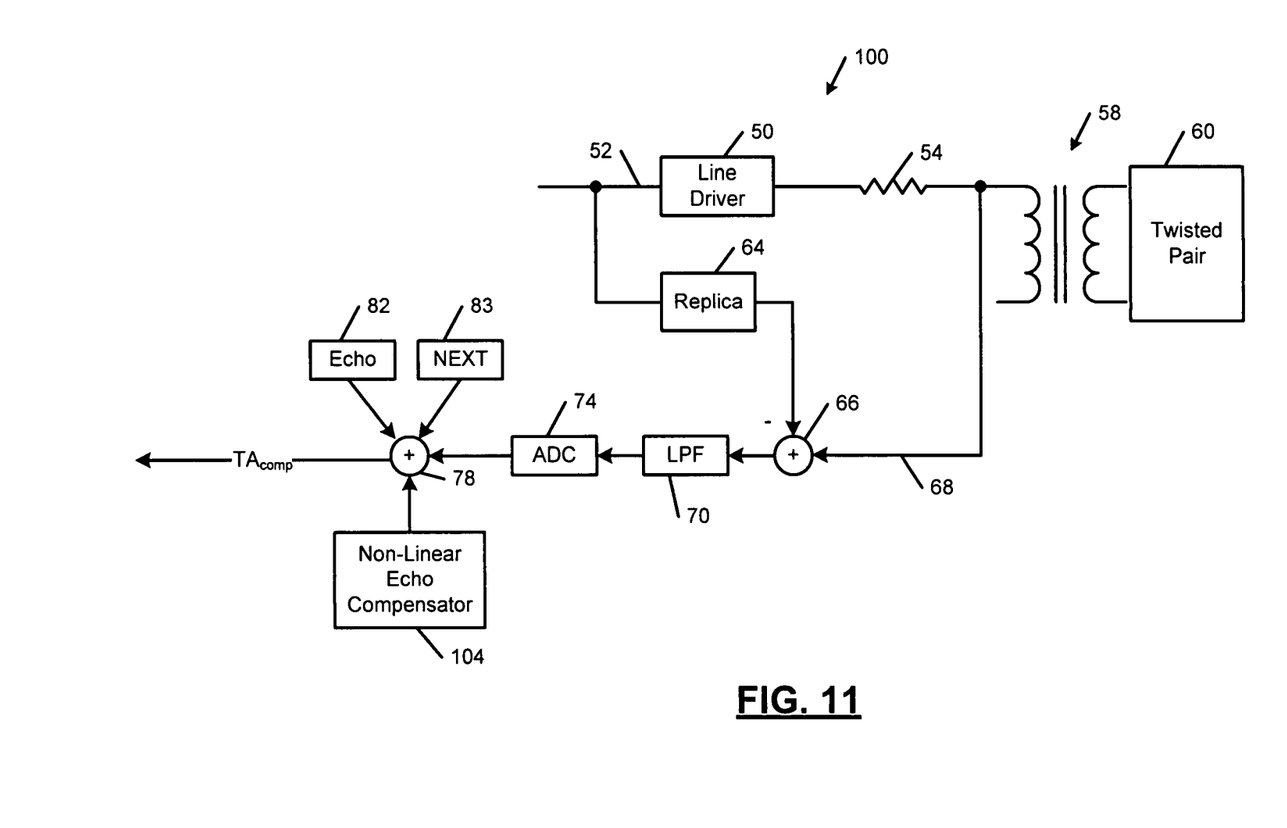
FIG. 11 is a functional block diagram illustrating a transceiver with a transmitter line driver and linear and nonlinear echo, NEXT and transmitter signal compensation according to the present invention.

Referring now to FIG. 11, a transceiver 100 according to the present invention receives a transmitter signal 52. The transmitter line driver 50 supplies a multi-level signal to a load such as the matched resistor 54 based on the transmitter signal 52. The transformer 58 couples the transmitter line driver 50 to the twisted pair 60. The replica signal generator 64 outputs a replica of the transmitter signal 52 to the summer 66. The received signal 68 is also input to the summer 66.

The output of the summer 66 is input to the LPF 70. An output of the LPF is input to the ADC 74. The output of the ADC 74 is input to the summer 78. The linear echo compensation signal from the linear echo compensation circuit 82 and the NEXT compensation signal from the circuit 83 (canceling $NEXT_{12}$, $NEXT_{13}$, and $NEXT_{14}$) are also input to the summer 78. A non-linear echo compensation signal from a compensator 104 according to the present invention is also input to the summer 78. A signal ($TA_{comp}$) with linear and nonlinear echo compensation and NEXT compensation is output by the summer 78.

Figure 12:
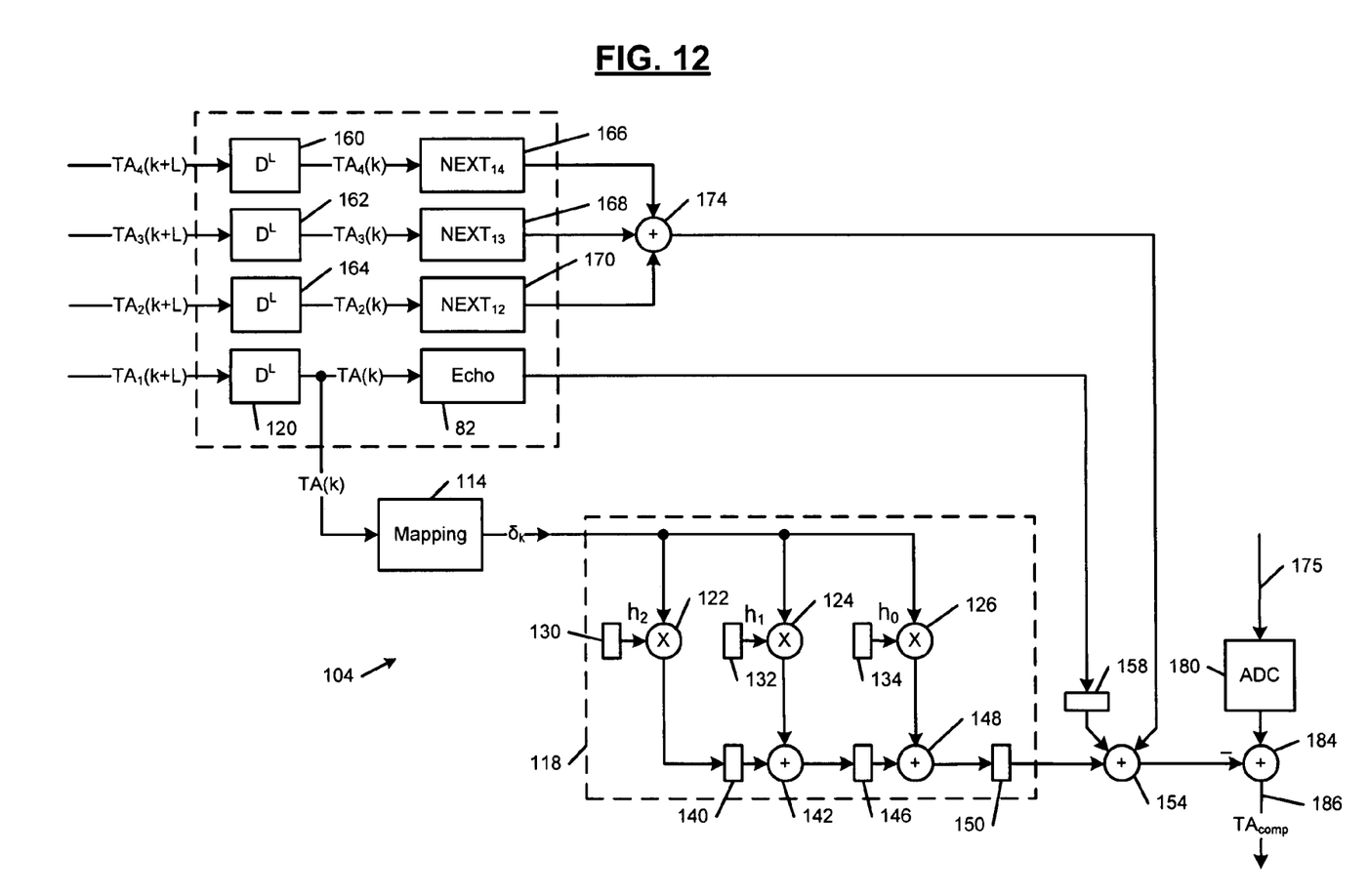
FIG. 12 illustrates a nonlinear echo compensation circuit according to the present invention.

Referring now to FIG. 12, the nonlinear echo compensator 104 is shown to include a mapping circuit 114 and a canceller circuit 118. A transmitted signal $TA_1(k+L)$ is input to a variable delay 120 that provides a delay of L clock cycles. The delayed transmitter signal is input to the linear echo compensation circuit 82 and the mapping circuit 114. The mapping circuit 114 outputs a pattern dependent driving signal $\delta_k$ to the canceller circuit 118. The pattern dependent driving signal is input to first inputs of first, second and third multipliers 122, 124 and 126. Another input of the multiplier 122 receives a third compensator coefficient $h_2$ from unit delay 130. As can be appreciated, unit delays can be implemented as a register or in any other suitable manner. A second input of the multiplier 124 receives a second compensator coefficient $h_1$ from unit delay 132. A second input of the multiplier 126 receives a first compensator coefficient $h_0$ from unit delay 134.

An output of the multiplier 122 is input to unit delay 140. An output of the unit delay 140 is input to a first input of a summer 142. An output of the multiplier 124 is input to a second input of the summer 142. An output of the summer 142 is input to unit delay 146. An output of the unit delay 146 is input to a first input of a summer 148. An output of the multiplier 126 is input to a second input of the summer 148. An output of the summer 148 is input to unit delay 150. An output of the unit delay 150 is input to a summer 154.

An output of the linear echo compensation circuit 82 is input to unit delay 158. An output of the unit delay 158 is input to the summer 154. Transmitter signals from other twisted pairs are input to variable delay circuits 160, 162 and 164. Outputs of the variable delay circuits 160, 162 and 164 are input to NEXT compensation circuits 166 168 and 170. Outputs of the NEXT compensation circuits 166, 168 and 170 are summed by a summer 174 and input to the summer 154. The transmitter signal $TA_1(k)$ is input to ADC 180 and output to a summer 184. An output of the summer 154 is input to an inverting input of the summer 184, which outputs the compensated signal ($TA_{comp}$) 186.

Figure 13:
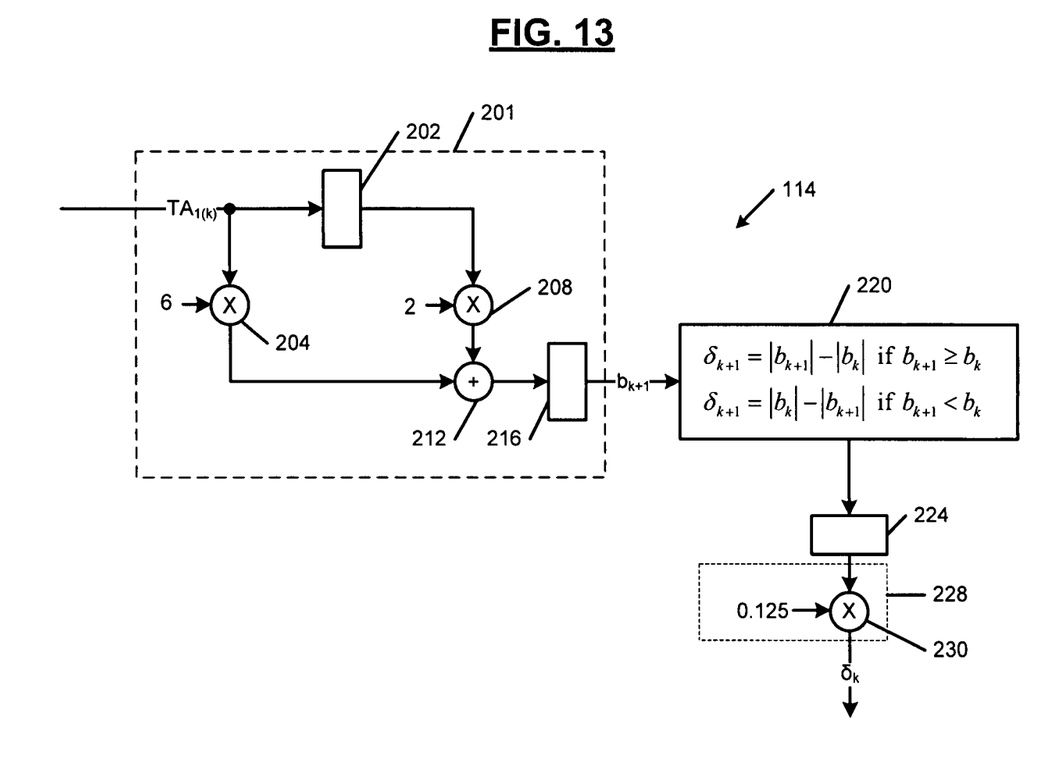
FIG. 13 illustrates a mapping circuit of FIG. 12 in further detail.

Referring now to FIG. 13, the mapping circuit 114 is illustrated in further detail. The mapping circuit 114 includes a weighting circuit 201. The transmitter signal is input to unit delay 202 and a first input of the multiplier 204. A second input of the multiplier 204 receives a first constant scale factor. An output of the unit delay 200 is input to a first input of a multiplier 208. A second input of the multiplier 208 is connected to a second constant scale factor. Outputs of the multipliers 204 and 208 are input to a summer 212. An output of the summer 212 is input to unit delay 216, which outputs a signal $b_{k+1}$ to a function generator 220. The function generator 220 outputs the pattern dependent driving signal (before delay and scaling) as follows:

$$\delta_{k+1} = |b_{k+1}| - |b_k| \text{ if } b_{k+1} \geq b_k$$

$$\delta_{k+1} = |b_k| - |b_{k+1}| \text{ if } b_{k+1} < b_k$$

The pattern dependent driving signal that is output by the function generator 220 is input to unit delay 224. An output of the unit delay 224 is input to a scaling circuit 228. One exemplary scaling circuit 228 includes a multiplier 230 having a first input coupled to the unit delay 224 and a second input coupled to a constant value. The scaling circuit 228 preferably offsets the effects of the weighting circuit 201, although other scaling may be performed. In the exemplary weighting circuit 201, the signal $TA_1(k)$ is multiplied by 6 and the signal $TA_1(k-1)$ is multiplied by 2. The scaling circuit 228 multiplies by ⅛.

Figure 14:
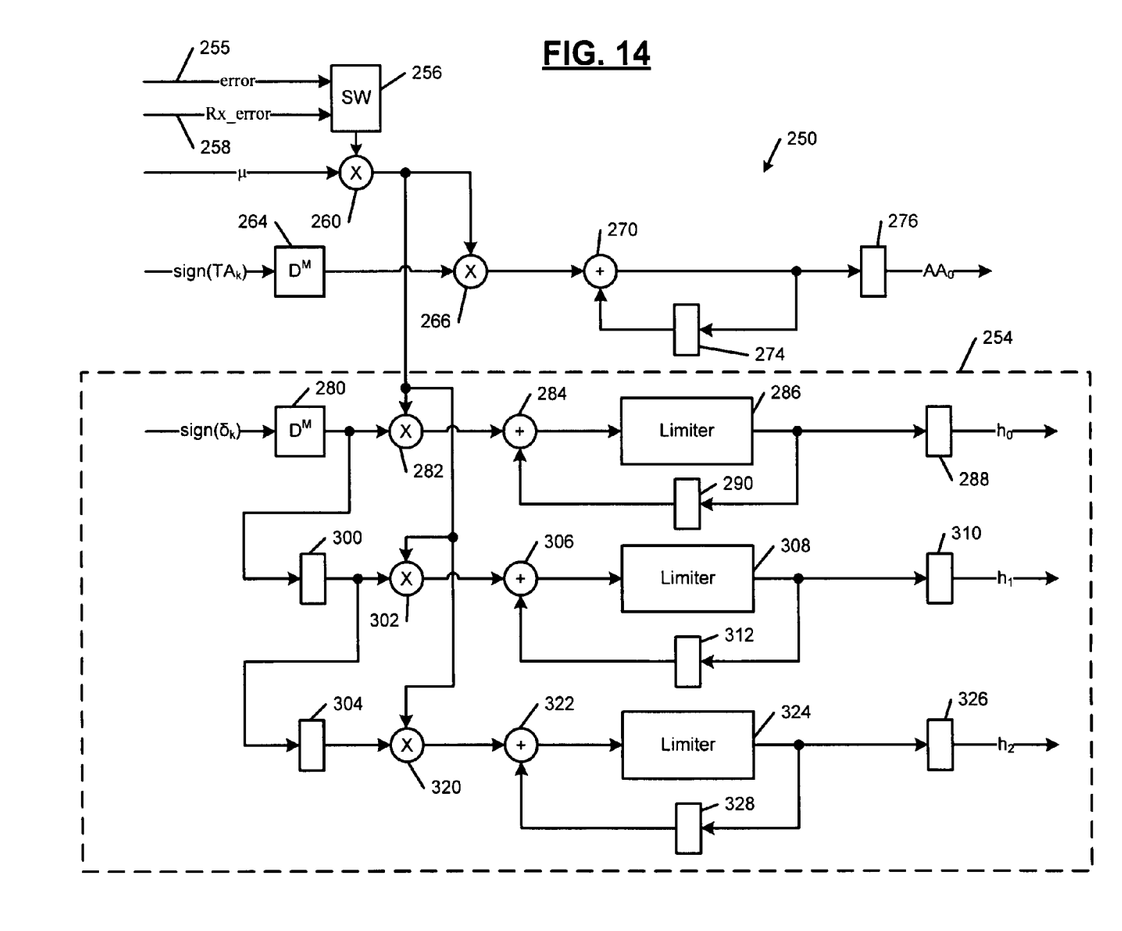
FIG. 14 illustrates a least means squared (LMS) circuit according to the present invention.

Referring now to FIG. 14, a least mean squared (LMS) circuit 250 is illustrated. The LMS circuit 250 includes a compensator coefficient generator 254. An error signal 255 is input to a selector switch 256. A receiver error signal 258 is also input to the selector switch 256. The selector switch 256 selects one of the error signals 255 or 258. The switch 256 preferably selects the output of the compensator (the summer 78 in FIG. 11) as the error signal when a remote transceiver has not sent signals. Ideally, the output of the summer 78 is zero since the receiver should not detect a signal. When an incoming signal is received, the switch 256 selects the error signal at the output of the followed detector, which eliminates the effect of the incoming signal in the error signal.

An output of the selector switch 256 is input to a multiplier 260. Another input of the multiplier 260 is coupled to a scaling factor or loop gain ($\mu$). An output of the multiplier 260 is input to the compensator coefficient generator 254. A sign function of the transmitted signal is input to a variable delay 264. An output of the variable delay is input to a multiplier 266. An output of the multiplier 260 is input to the multiplier 266. An output of the multiplier 266 is input to a summer 270. An output of the summer 270 is fed back through a unit delay 274 to the summer 270. An output of the summer 270 is input to unit delay 276. An output of the unit delay 276 provides a linear echo compensation signal ($AA_0$).

A sign function of the pattern dependent driving signal is input to a variable delay 280 of the compensator coefficient generator 254. An output of the variable delay 280 is input to a multiplier 282. An output of the multiplier 260 is also input to the multiplier 282. An output of the multiplier 282 is input to a summer 284. An output of the summer 284 is input to a limiter 286, which limits the signal input between upper and lower limits. For example, the limiter 286 may limit the signal to +/−1/32. An output of the limiter 286 is input to unit delay 288 and to unit delay 290. An output of the unit delay 290 is input to the summer 284. An output of the unit delay 288 provides the first compensator coefficient $h_0$ as follows:

$$h_0 \leftarrow h_0 + \mu * e_{k-L} * \text{sign}(\delta_k)$$

An output of the variable delay 280 is input to unit delay 300. An output of the unit delay 300 is input to a multiplier 302 and unit delay 304. An output of the multiplier 260 is also input to the multiplier 302. An output of the multiplier 302 is input to a summer 306. An output of the summer 306 is input to a limiter 308. An output of the limiter 308 is input to unit delays 310 and 312. An output of the unit delay 312 is input to the summer 306. An output of the unit delay 310 provides the second compensator coefficient $h_1$ as follows:

$$h_1 \leftarrow h_1 + \mu * e_{k-L} * \text{sign}(\delta_{k-1})$$

An output of the unit delay 304 is input to a multiplier 320. An output of the multiplier 260 is also input to the multiplier 320. An output of the multiplier 320 is input to a summer 322. An output of the summer 322 is input to a limiter 324. An output of the limiter 324 is input to unit delays 326 and 328. An output of the unit delay 328 is input to the summer 322. An output of the unit delay 326 provides the third compensator coefficient $h_2$ as follows:

$$h_2 \leftarrow h_2 + \mu * e_{k-L} * \text{sign}(\delta_{k-2})$$

Figure 15:
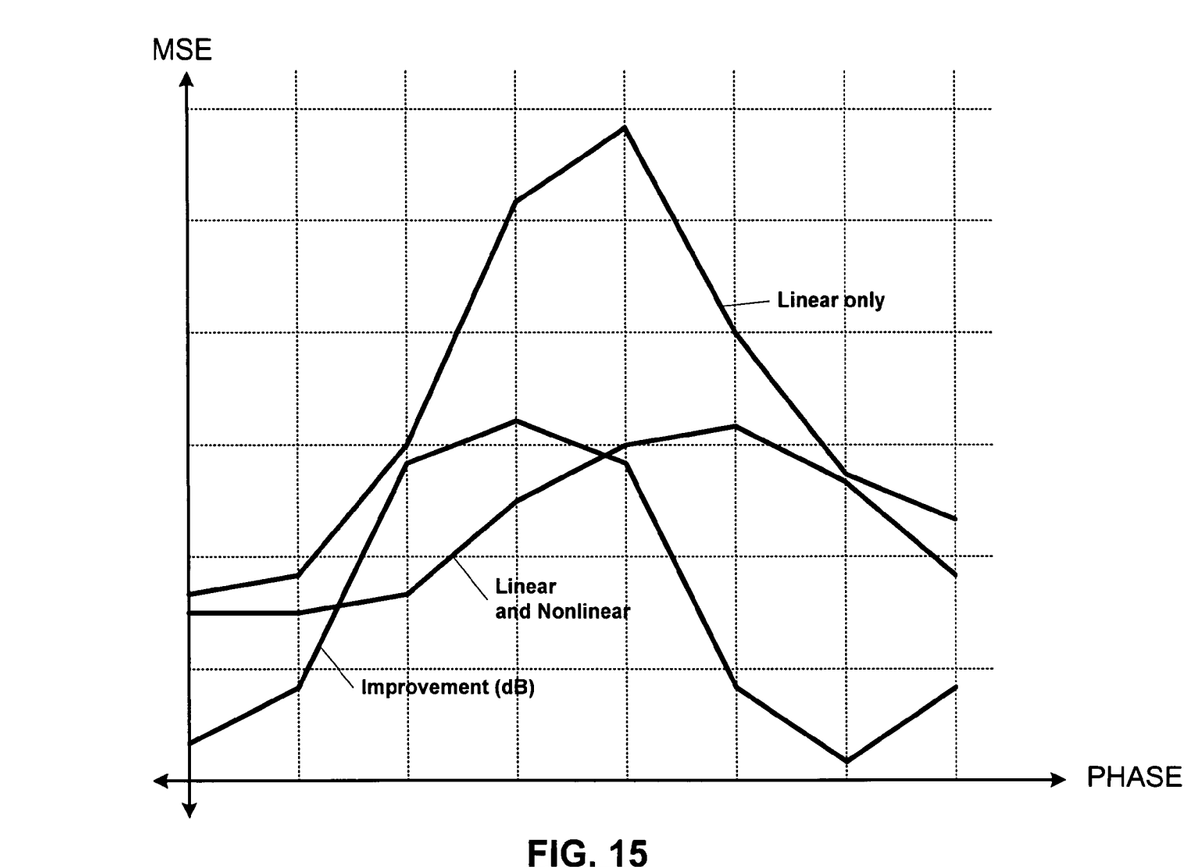
FIG. 15 illustrates mean squared error (MSE) as a function of sample phase for a first transceiver with linear echo compensation and a second transceiver according to the present invention with linear and nonlinear echo compensation.

Referring now to FIG. 15, mean squared error is shown as a function of sample phase. The mean squared error for transceivers with linear and nonlinear echo compensation according to the present invention is significantly lower than the mean squared error for transceivers with linear echo compensation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A nonlinear echo compensator comprising:
a mapping circuit comprising
a weighting circuit configured to generate a weighted signal based on (i) a current symbol, and (ii) a prior symbol, and
a function generating circuit configured to (i) update a plurality of functions based on the weighted signal, (ii) determine which one of the plurality of functions to select based on the weighted signal, and (iii) based on the determination, select one of the plurality of functions, wherein equations of the plurality of functions are predetermined and different, and wherein each of the equations is based on the weighted signal,
wherein the mapping circuit is configured to generate a driving signal based on (i) the selected one of the plurality of functions, and (ii) the weighted signal; and
a canceling circuit configured to generate a nonlinear echo compensation signal based on the driving signal.

2. The nonlinear echo compensator of claim 1, wherein the function generating circuit is configured to select the one of the plurality of functions based on the weighted signal as generated during a period of the prior symbol.

3. The nonlinear echo compensator of claim 1, wherein the mapping circuit is configured to generate the driving signal based on the weighted signal as generated during a period of the prior symbol.

4. The nonlinear echo compensator of claim 1, wherein the mapping circuit comprises a scaling circuit that scales an output of the function generating circuit.

5. The nonlinear echo compensator of claim 1, further comprising a coefficient generator, wherein the coefficient generator is configured to generate a first compensator coefficient, a second compensator coefficient, and a third compensator coefficient.

6. A transceiver comprising:
a transmitter;
a transmitter line driver comprising current cells, wherein the current cells are operated in an asymmetric low power mode; and
the nonlinear echo compensator of claim 1.

7. The nonlinear echo compensator of claim 1, wherein:
the weighting circuit is configured to receive a transmitted signal;
the transmitted signal includes the current symbol and the prior symbol; and
the current symbol is provided consecutively after the prior symbol in the transmitted signal.

8. The nonlinear echo compensator of claim 1, wherein the equations of the plurality of functions each include a weighted parameter of the weighted signal.

9. The nonlinear echo compensator of claim 1, wherein the equations of the plurality of functions each include a weighted value of the weighted signal.

10. The nonlinear echo compensator of claim 1, wherein the function generating circuit is configured to (i) compare the weighted signal to a predetermined value, and (ii) select the one of the plurality of functions based on the comparison.

11. The nonlinear echo compensator of claim 1, wherein:
the function generating circuit is configured to output a resultant value of the selected one of the plurality of functions; and
the driving signal includes a scaled version of the resultant value.

12. A nonlinear echo compensator comprising:
a mapping circuit comprising
a weighting circuit configured to generate a weighted signal based on (i) a current symbol, and (ii) a prior symbol, and
a function generating circuit configured to select one of a plurality of functions based on the weighted signal,
wherein the mapping circuit is configured to generate a driving signal based on (i) the selected one of the plurality of functions, and (ii) the weighted signal, and
a canceling circuit configured to generate a nonlinear echo compensation signal based on the driving signal,
wherein the weighting circuit is configured to generate the weighted signal by summing (i) a first product of the current symbol and a first weighting factor with (ii) a second product of the prior symbol and a second weighting factor.

13. A nonlinear echo compensator comprising:
a mapping circuit comprising
a weighting circuit configured to generate a weighted signal based on (i) a current symbol, and (ii) a prior symbol, and
a function generating circuit configured to select one of a plurality of functions based on the weighted signal,
wherein the mapping circuit is configured to generate a driving signal based on (i) the selected one of the plurality of functions, and (ii) the weighted signal;
a coefficient generator configured to generate a first compensator coefficient, a second compensator coefficient, and a third compensator coefficient; and
a canceling circuit configured to generate a nonlinear echo compensation signal based on the driving signal,
wherein the canceling circuit comprises
a first multiplier comprising (i) a first input configured to receive the driving signal, and (ii) a second input configured to receive the first compensator coefficient, wherein the first multiplier is configured to generate a first product,
a second multiplier comprising (i) a first input configured to receive the driving signal, and (ii) a second input configured to receive the second compensator coefficient, wherein the second multiplier is configured to generate a second product, and a third multiplier comprising (i) a first input configured to receive the driving signal, and (ii) a second input configured to receive the third compensator coefficient, wherein the third multiplier is configured to generate a third product.

14. The nonlinear echo compensator of claim 13, wherein the canceling circuit comprises:
a first delay circuit configured to receive the third product of the third multiplier;
a first summer comprising (i) a first input configured to receive the second product of the second multiplier, and (ii) a second input in communication with the first delay circuit;
a second delay circuit in communication with an output of the first summer; and
a second summer comprising (i) a first input in communication with the second delay circuit, and (ii) a second input configured to receive the first product of the first multiplier.

15. A transceiver comprising:
a transmitter;
a transmitter line driver comprising current cells, wherein the current cells are operated in an asymmetric low power mode; and
the nonlinear echo compensator of claim 13.

16. A system comprising:
a nonlinear echo compensator comprising
a mapping circuit comprising
a weighting circuit configured to generate a weighted signal based on (i) a current symbol, and (ii) a prior symbol, and
a function generating circuit configured to select one of a plurality of functions based on the weighted signal,
wherein the mapping circuit is configured to generate a driving signal based on (i) the selected one of the plurality of functions, and (ii) the weighted signal, and
a canceling circuit configured to generate a nonlinear echo compensation signal based on the driving signal, and
a transceiver comprising
a linear echo compensator configured to generate a linear echo compensation signal,
a crosstalk signal generator configured to generate a near end crosstalk signal, and
a summer in communication with the linear echo compensator, the crosstalk signal generator, and the nonlinear echo compensator, wherein the summer is configured to generate a combined compensation signal.

17. A transceiver comprising:
a transmitter;
a transmitter line driver comprising current cells, wherein the current cells are operated in an asymmetric low power mode; and
the nonlinear echo compensator of claim 16.

18. A method of compensating for nonlinear echo, the method comprising:
generating a weighted signal based on (i) a current symbol, and (ii) a prior symbol;
updating a plurality of functions based on the weighted signal;
determining which one of the plurality of functions to select based on the weighted signal;
based on the determination, selecting one of the plurality of functions based on the weighted signal, wherein equations of the plurality of functions are predetermined and different, and wherein each of the equations is based on the weighted signal;
generating a driving signal based on (i) the selected one of the plurality of functions, and (ii) the weighted signal; and
generating a nonlinear echo compensation signal based on the driving signal.

19. The method of claim 18, further comprising selecting the one of the plurality of functions based on the weighted signal as generated during a period of the prior symbol.

20. The method of claim 18, further comprising generating the driving signal based on the weighted signal as generated during a period of the prior symbol.

21. The method of claim 18, further comprising generating a first compensator coefficient, a second compensator coefficient, and a third compensator coefficient.

22. A method of compensating for nonlinear echo, the method comprising:
generating a weighted signal based on (i) a current symbol, and (ii) a prior symbol;
selecting one of a plurality of functions based on the weighted signal, wherein equations of the plurality of functions are predetermined and different;
generating a driving signal based on (i) the selected one of the plurality of functions, and (ii) the weighted signal;
generating a nonlinear echo compensation signal based on the driving signal; and
generating the weighted signal by summing (i) a first product of the current symbol and a first weighting factor with (ii) a second product of the prior symbol and a second weighting factor.

23. A nonlinear echo compensator comprising:
a mapping circuit comprising
a weighting circuit configured to generate a weighted signal based on (i) a current symbol, and (ii) a prior symbol, and
a function generating circuit configured to select one of a plurality of functions based on the weighted signal, wherein equations of the plurality of functions are predetermined and different,
wherein the mapping circuit is configured to generate a driving signal based on (i) the selected one of the plurality of functions, and (ii) the weighted signal; and
a canceling circuit configured to generate a nonlinear echo compensation signal based on the driving signal,
wherein the plurality of functions comprise
a first function setting the driving signal for a current period based on a first difference between (i) the weighted signal for the current period and (ii) the weighted signal for a period prior to the current period,
a second function setting the driving signal for the current period based on a second difference between (i) the weighted signal for the current period and (ii) the weighted signal for the period prior to the current period, and
a result of the first difference is different than a result of the second difference.

24. A transceiver comprising:
a transmitter;
a transmitter line driver comprising current cells, wherein the current cells are operated in an asymmetric low power mode; and
the nonlinear echo compensator of claim 12.

* * * * *